(12) United States Patent
Poupko et al.

(10) Patent No.: US 9,372,853 B1
(45) Date of Patent: Jun. 21, 2016

(54) HOMOMORPHIC DOCUMENT TRANSLATION

(71) Applicant: Cisco Technology, Inc., San Jose, CA (US)

(72) Inventors: Avraham Poupko, Jerusalem (IL); Koby Gvirtz, Jerusalem (IL); Harel Cain, Jerusalem (IL); Michal Devir, Haifa (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/628,251

(22) Filed: Feb. 22, 2015

(51) Int. Cl.
*G06F 17/28* (2006.01)

(52) U.S. Cl.
CPC .................... *G06F 17/289* (2013.01)

(58) Field of Classification Search
CPC . H04L 9/008; H04L 2209/24; H04L 2209/26; H04L 9/0816; H04L 9/3026
USPC .............. 704/2; 380/28, 29, 30; 707/748, 758
See application file for complete search history.

(56) References Cited

U.S. PATENT DOCUMENTS

| | | | |
|---|---|---|---|
| 7,724,918 B2 | 5/2010 | Balakrishnan et al. | |
| 8,069,053 B2 | 11/2011 | Gervais et al. | |
| 8,347,398 B1 | 1/2013 | Weber | |
| 8,837,715 B2 * | 9/2014 | Troncoso Pastoriza | H04L 9/008 380/28 |
| 2014/0289260 A1 * | 9/2014 | Simske | G06F 17/30616 707/748 |

OTHER PUBLICATIONS

SCIGEN—An Automatic CS Paper Generator Can be found at: pdos.csail.mit.edu/scigen/.
Random Jargon Generator Trojan Mice Can be found at: ttp://www.trojanmice.com/randomjargongenerator.htm.
Collberg, Christian; A Taxonomy of Obfuscating Transformations, Department of Computer Science, The University of Auckland, New Zealand, 1997.
Patent Translator; Patent Translator'S Blog, 2014 Can be found at: http://patenttranslator.wordpress.com/2014/09/03/a-few-common-sense-precautions-for-translators-intent-on-preserving-confidentiality-of-information/.
Potthast, Martin; Overview of the 4th International Competition on Plagiarism Detection, 2013.
Ruch, Patrick; Medical Document Anonymization With a Semantic Lexicon, Proc AMIA Symp. 2000: 729-733.

(Continued)

*Primary Examiner* — Charlotte M Baker
(74) *Attorney, Agent, or Firm* — Samuel M. Katz

(57) ABSTRACT

In one embodiment, a method, system, and apparatus is described for preprocessing a document to be translated by an translation service by identifying in the document information which is not to be translated, removing the not to be translated information from the document, associating each one unit of the not to be translated information with one placeholder which holds a place for the one unit of not to be translated in the document, replacing the not to be translated information with placeholders in the document, and storing the not to be translated information as metadata, sending the preprocessed document to the translation service for translation, receiving a translated version of the preprocessed document from the translation service, and postprocessing the received translated document by retrieving the stored metadata, and replacing each one of the placeholders with its associated one unit of not to be translated information. Related methods, systems, and apparatuses are also described.

20 Claims, 12 Drawing Sheets

(56) References Cited

OTHER PUBLICATIONS

Voris, Jonathan; Lost in Translation: Improving Decoy Documents Via Automated Translation, Security and Privacy Workshops (SPW), 2012 IEEE Symposium on, vol., No., pp. 129,133, May 24-25, 2012.

Zbynek, Loebl; Legal Security for Transformations of Signed Documents Fundamental Concepts, Fraunhofer-SIT, Darmstadt Second European PKI Workshop, The University of Kent, England Jun. 30-Jul. 1, 2005.

* cited by examiner

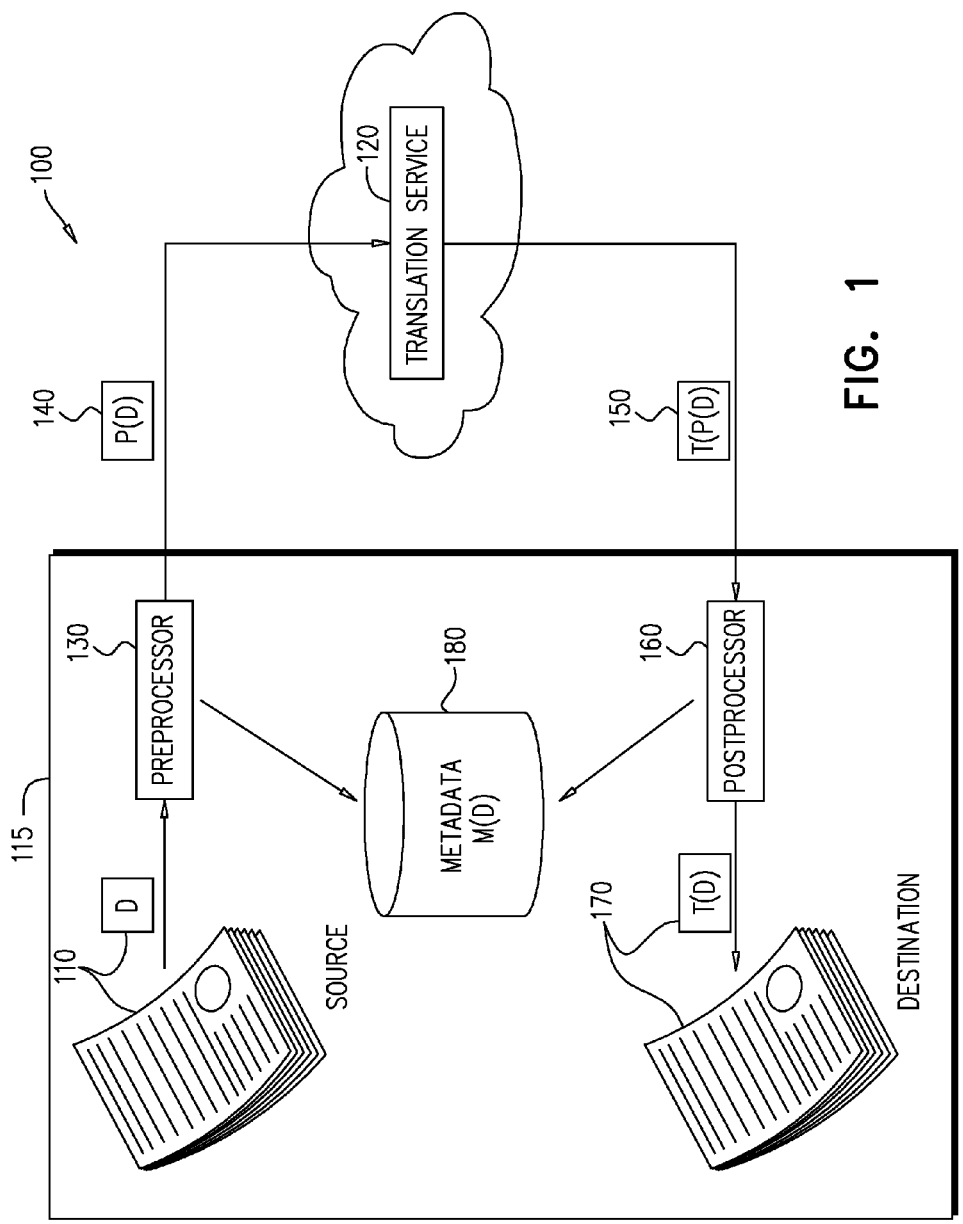

FIG. 2

This is a contract entered into by [Alice] (hereinafter referred to as "the Provider") and [Bob] (hereinafter referred to as "the Client") on this date, [7 December 2014.]
The [Provider's] place of business is [New York] and the Client's place of business is [Atlanta.]
The Client hereby engages the [Provider] to provide services described herein under "Scope and Manner of Services." The Provider hereby agrees to provide the Client with such services in exchange for consideration described herein under ["Payment for Services Rendered."]
[Scope and Manner of Services]
Services To Be Rendered By [Provider] enumerate here each particular task to be performed and its acceptable result, i. e., Audit the Client's business accounting records in accordance with generally accepted accounting principles, and provide to the Client a written audit report conforming to the guidelines of the Institute of Internal Auditors.
[Payment for Services Rendered]
The Client shall pay the [Provider] for services rendered according to the Payment Schedule attached, within [7 calendar days] of the date on any invoice for services rendered from the [Provider.]
Should the Client fail to pay the [Provider] the full amount specified in any invoice within [14 calendar days] of the invoice's date, a late fee equal to [$50] shall be added to the amount due and interest of [12 percent per annum] shall accrue from the [14th calendar day] following the invoice's date.
Applicable Law
This contract shall be governed by the laws of the County of Queens in the State of New York and any applicable Federal law.

FIG. 3

This is a contract entered into by Alice (hereinafter referred to as "the Provider") and Bob (hereinafter referred to as "the Client") on this date, 7 December 2014. The Provider's place of business is New York and the Client's place of business is Atlanta. The Client hereby engages the Provider to provide services described herein under "$#_101!." The Provider hereby agrees to provide the Client with such services in exchange for consideration described herein under "$#_102!."
$#_103! Services To Be Rendered By Provider: enumerate here each particular task to be performed and its acceptable result, i.e., Audit the Client's business accounting records in accordance with generally accepted accounting principles, and provide to the Client a written audit report conforming to the guidelines of the Institute of Internal Auditors.
$#_104! The Client shall pay the Provider for services rendered according to the Payment Schedule attached, within 7 calendar days of the date on any invoice for services rendered from the Provider.
Should the Client fail to pay the Provider the full amount specified in any invoice within 14 calendar days of the invoice's date, a late fee equal to $50 shall be added to the amount due and interest of 12 percent per annum shall accrue from the 14th calendar day following the invoice's date.
Applicable Law
This contract shall be governed by the laws of the County of Queens in the State of New York and any applicable Federal law.

FIG. 4

This is a contract entered into by Alice (hereinafter referred to as "the Provider") and Bob (hereinafter referred to as "the Client") on this date, %@221_+. 407
The Provider's place of business is New York and the Client's place of business is Atlanta.
The Client hereby engages the Provider to provide services described herein under "Scope and Manner of Services." The Provider hereby agrees to provide the Client with such services in exchange for consideration described herein under "Payment for Services Rendered."
Scope and Manner of Services
Services To Be Rendered By Provider: enumerate here each particular task to be performed and its acceptable result, i. e., Audit the Client's business accounting records in accordance with generally accepted accounting principles, and provide to the Client a written audit report conforming to the guidelines of the Institute of Internal Auditors.
Payment for Services Rendered 409
The Client shall pay the Provider for services rendered according to the Payment Schedule 414 attached, within %@222_+ of the date on any invoice for services rendered from the Provider. Should the Client fail to pay the Provider the full amount specified in any invoice within %@223_+ days of the invoice's date, a late fee equal to %@226_+ shall be added to the amount due and interest of %@225_+ shall accrue from the %@224_+ following the invoice's date.
Applicable Law 415   416   413
This contract shall be governed by the laws of the County of Queens in the State of New York and any applicable Federal law.

FIG. 5

This is a contract entered into by [Mallory] (hereinafter referred to as "the [Pomalato]") and [Eve] (hereinafter referred to as "the Client") on this date, 7 December 2014.
The [Pomalato]'s place of business is {*@321} and the Client's place of business is &!210p.
The Client hereby engages the [Pomalato] to provide services described herein under "Scope and Manner of Services." The [Pomalato] hereby agrees to provide the Client with such services in exchange for consideration described herein under "Payment for Services Rendered."
Scope and Manner of Services
Services To Be Rendered By [Pomalato]: enumerate here each particular task to be performed and its acceptable result, i. e., Audit the Client's business accounting records in accordance with generally accepted accounting principles, and provide to the Client a written audit report conforming to the guidelines of the Institute of Internal Auditors.
Payment for Services Rendered
The Client shall pay the [Pomalato] for services rendered according to the Payment Schedule attached, within 7 calendar days of the date on any invoice for services rendered from the [Pomalato] the full amount specified in any invoice within
Should the Client fail to pay the 14 calendar days of the invoice's date, a late fee equal to $50 shall be added to the amount due and interest of 12 percent per annum shall accrue from the 14th calendar day following the invoice's date.
Applicable Law
This contract shall be governed by the laws of the County of Queens in the State of New York and any applicable Federal law.

FIG. 7

This is a contract never entered into by Alice (hereinafter referred to as "the Provider") and Bob (hereinafter referred to as "the Client") on this date, 7 December 2014. The Provider's place of business is New York and the Client's place of business is Atlanta. Based on the present scenario front loading delivery systems should harmonize the budgetary interface with avoiding conflicts of interest. The Client hereby does not engages the Provider to provide services described herein under "Scope and Manner of Services." The Provider hereby agrees to provide the Client with such services in exchange for consideration described herein under "Payment for Services Rendered."

FIG. 8

$#_103!
The Pomalato's place of business is not *@321} and the Client's place of business is &!210p}
This is a contract never entered into by Mallory (hereinafter referred to as "the Pomalato")
and Eve (hereinafter referred to as "the Client") on this date, %@221_+.
Services To Be Rendered By Pomalato: enumerate here each particular task to be performed and
its acceptable result, i.e., Audit the Client's business accounting records in accordance with
generally accepted accounting principles, and provide to the Client a written audit report
conforming to the guidelines of the Institute of Internal Auditors.
Based on the present scenario front loading delivery systems should harmonize the budgetary
interface with avoiding conflicts of interest.
The Client hereby does not engages the Pomalato to provide services described herein under
"$#_101!" The Pomalato hereby agrees to provide the Client with such services in exchange for
consideration described herein under ""$#_102!"
$#_104!
The Client shall pay the Pomalato for services rendered according to the Payment Schedule
attached, within %@222_+ of the date on any invoice for services rendered from the Pomalato.
Should the Client fail to pay the Pomalato the full amount specified in any invoice within
%@223_+ of the invoice's date, a late fee equal to %@224_+ shall be added to the amount
due and interest of %@225_+ per annum shall accrue from the %@226_+ following the invoice's
date.
Applicable Law
This contract shall be governed by the laws of the County of Queens in the State of New York
and any applicable Federal law.

FIG. 9

[#$_ 103!] La place de la [Pomalato] d'entreprise [ne est pas] [*@}321] et la place d'affaires du client est [&!:210p]
Ce est un contrat [jamais] conclu par [Mallory] à cette date, [%@221_+] (ci-après dénommé «[le Pomalato]») et [Eve] (ci-après
dénommé «[le Client]») à cette date, [Pomalato] énumérer ici chaque tâche particulière à être exécutée et
Services à être rendus par [Pomalato] i. e., la vérification des documents comptables de l'entreprise du client
son résultat acceptable, conformément aux principes comptables généralement reconnus, et de fournir au client un
rapport d'audit écrit conforme aux directives de l'Institut des vérificateurs internes.
Basé sur les systèmes actuels de prestation de chargement scénario avant devrait harmoniser
l'interface budgétaire éviter les conflits d'intérêt.
Le Client se engage par les présentes ne pas [Pomalato] de fournir des services décrits ici sous
[#$_ 101!] Le [Pomalato] se engage à fournir au client de ces services pour une contrepartie décrit
ici sous [$#_102!]
[#$_ 104!] Le client doit payer le [Pomalato] pour services rendus conformément au calendrier de paiement
ci-joint, dans [%@222_+] de la date sur les factures pour des services rendus de la [Pomalato]
Si le client ne parviennent pas à payer le [Pomalato] le montant intégral précisé dans ne importe
quelle facture dans [%@223_+] de la date de la facture, des frais de retard égale à [%@224_+] est
ajouté au montant dû et les intérêts de [%@225_+] par an courent du [%@226_+] suivant la date de
la facture.
Ce contrat est régi par les lois du comté de Queens dans l'État de New York et de toute loi
fédérale applicable.

HOMOMORPHIC DOCUMENT TRANSLATION

FIELD OF THE INVENTION

The present invention generally relates to a method and system for securely using an online translation service for translating a document.

BACKGROUND OF THE INVENTION

Online translation services are available which provide free translation of documents with good translation results. Such translation services now provide reasonably translated output.

BRIEF DESCRIPTION OF THE DRAWINGS

The present invention will be understood and appreciated more fully from the following detailed description, taken in conjunction with the drawings in which:

FIG. 1 is a simplified illustration of a system for preparing a document for homomorphic translation constructed and operative in accordance with an embodiment;

FIG. 2 is a sample document for homomorphic translation in the system of FIG. 1;

FIG. 3 is a first exemplary modification of the document of FIG. 2 where internal references and similar matter have been replaced;

FIG. 4 is a second exemplary modification of the document of FIG. 2 where numbers, dates, equations, formulae, functions and similar matter have been replaced;

FIG. 5 is a third exemplary modification of the document of FIG. 2 where proper names and similar matter have been replaced;

FIG. 7 is a fifth exemplary modification of a portion of the document of FIG. 2 where the sentences have been negated in the document;

FIG. 8 is a composite version of the document of FIG. 2, combining the exemplary modifications depicted in FIGS. 3-7;

FIG. 9 is a French translation of the document of FIG. 8;

DESCRIPTION OF EXAMPLE EMBODIMENTS

Overview

Figure 6:
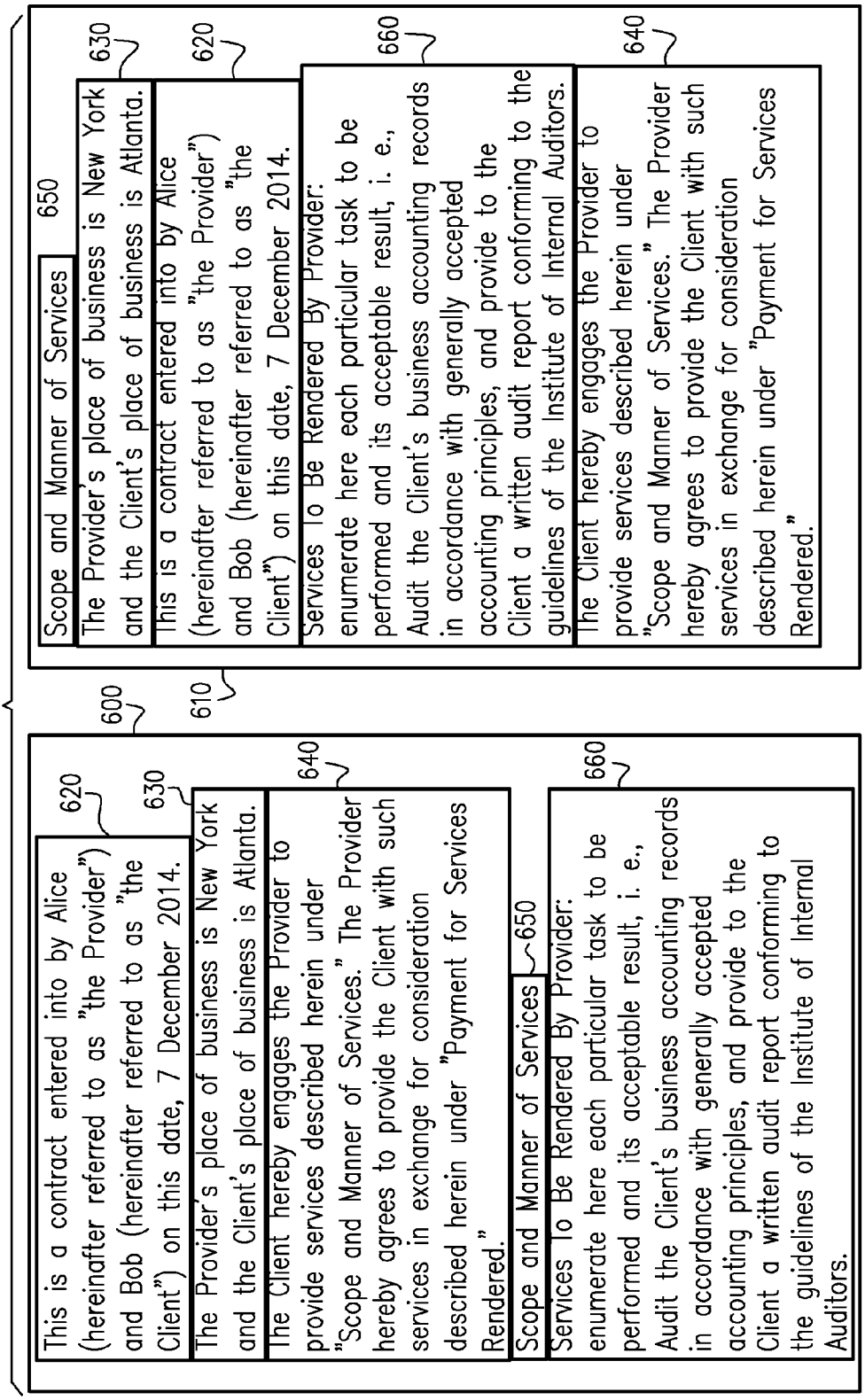
FIG. 6 is a fourth exemplary modification of a portion of the document of FIG. 2 where the order of sentences has been permuted in the document.

A method, system, and apparatus is described for preprocessing a document to be translated by an translation service by identifying in the document information which is not to be translated, removing the not to be translated information from the document, associating each one unit of the not to be translated information with one placeholder which holds a place for the one unit of not to be translated in the document, replacing the not to be translated information with placeholders in the document, and storing the not to be translated information as metadata, sending the preprocessed document to the translation service for translation, receiving a translated version of the preprocessed document from the translation service, and postprocessing the received translated document by retrieving the stored metadata, and replacing each one of the placeholders with its associated one unit of not to be translated information. Related methods, systems, and apparatuses are also described.

Exemplary Embodiments

Reference is now made to FIG. 1 which is a simplified illustration of a system for preparing a document for homomorphic translation constructed and operative in accordance with an embodiment. The use of free, online translation engines for translating documents has become prevalent. At present, the available online translation engines offer good results for minimal or no cost, and with minimal effort. As will be discussed below in greater detail, a document to be translated is preprocessed by a preprocessor, and uploaded to an online translation service which returns a translated version of the document. The translated version of the document is then postprocessed by a postprocessor, yielding a translated version of the source document. Because the preprocessing and postprocessing are designed to be a "commutative" operation to each other, the system of FIG. 1 may be described as a "homomorphic translation" system.

It is appreciated that the preprocessor and postprocessor described herein may, respectively, be implemented in a single microprocessor, in separate microprocessors, in software packages, or partially in one or more microprocessors and partially in software packages.

For the purposes of the present specification and claims, the term "document" is understood to mean a piece of written, printed, or electronic matter that provides information. Because the present specification and claims is dealing with an online environment, a written or printed document would be transcribed, scanned, or otherwise converted to electronic matter before being input into the online translation engines for translating.

Some documents might have confidential or secret information in them. Thus, from a security standpoint, there is cause for concern that in using an online translation engine, the provider of the translation service is made privy to the confidential or secret information in the document which is sent for translation.

An opportunity has been identified for allowing online translation of such documents containing sensitive information where the sensitivity may lie in specific numerical information; disclosure of the parties involved; disclosure of the subject matter; or other sensitive information found in the document.

Turning specifically to the system 100 of FIG. 1, a source document, D 110 located on a device 115 is designated for sending to an online translation service 120. Prior to being sent to the online translation service 120, the source document, D 110 is processed by a preprocessor 130. The source document, D 110, after it is processed by the preprocessor 130 is denoted as P(D) 140. P(D) 140 is uploaded to the cloud-based online translation service 120. P(D) 140 is translated by the cloud-based online translation service 120, and the translated P(D) 140 is denoted T(P(D)) 150. T(P(D)) 150 is returned by the cloud-based online translation service 120 to the sending device 115. T(P(D)) 150 is sent to a postprocessor 160 that converts T(P(D)) 150 to a translated version of the original document, essentially applying an inverse function $P^{-1}$ that takes T(P(D)) 150 and yields a destination document T(D) 170, the translated version of source document, D 110. Because of the relationship between T( ) and P( ), namely, that that T( ) and P( ) are constructed so as to be practically commutative with each other, the translation system 100 of FIG. 1 may, as noted above, be deemed a "homomorphic translation" system.

The postprocessor 160 has access to metadata M(D) 180 prepared by the preprocessor 130 while it preprocesses document D 110. The metadata M(D) 180 is used to store information which it is preferable to not risking exposure when the document D 110 is sent to the online translation service 120. Therefore the information in the metadata M(D) 180 is not sent to the online translation service 120. The metadata M(D) 180 is used by the postprocessor 160 to turn the translation results T(P(D)) 150 of the modified document into translation results of the original document: (T(P(D)), M(D))→T(D).

The preprocessor 130 performs a variety of operations, some of which may involve replacing terms (which, typically, have not as yet been translated), in the document D 110 with placeholders. Terms to be replaced may be manually marked, or a list of terms to be replaced which may be manually or automatically populated may then be used by the preprocessor 130 in order to determine which terms in the document D 110 should be replaced. Additionally, it should be appreciated that certain terms, such as numbers which are spelled out and technical abbreviations may need to be either manually or automatically replaced by a form which is recognizable by the preprocessor 130 are identified as requiring replacing. For some terms, a technical glossary may serve as a list of terms requiring replacement.

Reference is now made to FIG. 2, which shows a sample document 200 (corresponding to the document D 110 of FIG. 1) for homomorphic translation in the system of FIG. 1. The figures following FIG. 2 provide examples of techniques and methods which may be applied by the preprocessor 130 and then inverted by the postprocessor 160 in a commutative fashion, as discussed above. Several exemplary features of the sample document 200 are worth noting:

There are several internal references in the document 200 of FIG. 2. For example, one part of the introductory portion of the document 200 states:

The Client hereby engages the Provider to provide services described herein under "Scope and Manner of Services." (203)

There follows in the document a section entitled "Scope and Manner of Services." (205)

Several numbers, numerical terms, dates, and so forth, appear in the document: 7 Dec. 2014 (207); 7 calendar days (209); a late fee equal to $50 shall be added (213); interest of 12 percent (213), and so forth.

Proper names, such as "Alice" (217) and "Bob" (219) appear in the document.

Note that in the above section, reference numbers are placed in parentheses. This is done because a phrase such as "7 Dec. 2014" followed by a reference number 207 might be confusing, if written 7 Dec. 2014 207. To alleviate potential confusion of this manner, all such reference numbers are therefore parenthetical.

It should be appreciated that the above list is not exhaustive, and in the examples which follow, many other exemplary text items which can be replaced or modified by the preprocessor 130 and subsequently inverted by the postprocessor 160 are shown. Additionally, the examples below are not exhaustive and are not meant to exclude other embodiments of changes, permutations, or modifications which the preprocessor 130 may make in the document 200.

Reference is now additionally made to FIG. 3, which is a first exemplary modification of the document of FIG. 2 where internal references and similar matter has been replaced. One example of an internal document reference was mentioned above with reference to FIG. 2. Namely, one part of the introductory portion of the document 200 states:

The Client hereby engages the Provider to provide services described herein under "Scope and Manner of Services." (203)

There follows in the document a section entitled "Scope and Manner of Services." (205).

In FIG. 3, the portion of the document 200 which stated:

The Client hereby engages the Provider to provide services described herein under "Scope and Manner of Services." (203)

has been modified to recite:

The Client hereby engages the Provider to provide services described herein under "$#_101! (310)." (303)

The internal document reference to the section of the document 200 entitled "Scope and Manner of Services" (205) has been modified so as to prevent exposing any information which might be of interest to a third party which might be revealed by this reference. The actual text of the reference itself, i.e. "Scope and Manner of Services" 203 may either be translated in a separate query of the online translation service, or offline translation software may be used to provide the translation. Presumably, sending snippets of text, such as "Scope and Manner of Services", outside of their context, to the online translation service will not typically reveal much information. In some embodiments, the text to be sent to the online translation service separately may be sent to the online translation service from a different IP address, so as to further obfuscate the source and context of the text.

The corresponding cross-referenced text, the header Scope and Manner of Services (205) has been replaced with a placeholder: $#_103! (320). Although the string of text, "Scope and Manner of Services", is the same in both places it appears in the document 200, it has been replaced in these places with different placeholders. In some embodiments, multiple instances of the identical text may be replaced by identical placeholders. By way of example, the two instances of the text Scope and Manner of Services (203, 205) may both be replaced by the same placeholder "$#_101!", rather than one instance being replaced by the placeholder "$#_101!", and the second instance being replaced by the placeholder "$#_103!".

A second internal document reference, "The Provider hereby agrees to provide the Client with such services in exchange for consideration described herein under "Payment for Services Rendered" (218), which refers to the document section "Payment for Services Rendered" (220) is replaced, respectively, with the placeholders "$#_102!" (330) and "$#_104!" (340).

It should be appreciated that the document cross-references in document 200 may comprise hyperlinks. Thus, in a first example of techniques and methods which may be applied by the preprocessor 130 and then inverted by the postprocessor 160 in a commutative fashion, hyperlinks and internal references are removed, replaced with placeholders in the document 200, and corresponding contents are placed in the metadata M(D) 180, such that after translation they may be resolved by the postprocessor 160 to the original links and references. Similarly, although not depicted in FIG. 3, all diagrams, figures and drawings are replaced with placeholders in the document 200, and corresponding contents is placed in the metadata M(D) 180, such that after translation they may be resolved by the postprocessor 160 to the original diagrams, figures and drawings. It should be appreciated that the metadata M(D) 180 may be stored locally, or where the translated destination document T(D) 170 is to be sent to a third party.

The metadata M(D) 180 may be encrypted using standard techniques known in the art, and then sent to the third party, for later postprocessing by the postprocessor 160.

Reference is now additionally made to FIG. 4, which is a second exemplary modification of the document of FIG. 2 where numbers, dates, equations, formulae, functions and similar matter have been replaced. Numbers, dates, equations, formulae, functions and similar matter are removed, replaced with placeholders in the document 200, and corresponding contents are placed by the preprocessor 130 in the metadata M(D) 180, such that after translation they may be resolved by the postprocessor 160 to the original numbers, dates, equations, formulae, functions and similar matter.

By way of example in FIG. 4, six replacements are made:

| Original Text and item number (FIG. 2) | Placeholder and item number (FIG. 4) |
| --- | --- |
| 7 Dec. 2014 (207) | % @221_+ (407) |
| 7 calendar days (209) | % @222_+ (409) |
| 14 calendar days (214) | % @223_+ (414) |
| $50 (213) | % @224_+ (413) |
| 12 percent per annum (215) | % @225_+ (415) |
| 14th calendar day (216) | % @226_+ (416) |

Reference is now additionally made to FIG. 5, which is a third exemplary modification of the document 200 of FIG. 2 where proper names and similar matter have been replaced. A natural language processing library is used to detect all proper names (such as names of people, place names, company names etc.) and replace them with placeholders that can be simple symbols or other, randomly chosen, proper names. By way of Example, in FIG. 5, the name Alice (217 FIG. 2) has been replaced with Mallory (517). Likewise, the name Bob (219 FIG. 2) has been replaced with Eve (519). The place names New York (230 FIG. 2) and Atlanta (235 FIG. 2) have been replaced, respectively, with placeholders *@321 (530) and &!210p (535).

Similarly, the user of the system of FIG. 1 is able to designate user-specific words (beyond the proper names automatically replaced in the previous transformation) that should not be translated, and should not be sent to the translation engine. By way of example, the term "Provider" (240, FIG. 2) may be user designated to be replaced by the term "Pomalato" (540), as shown in the figure. It should be appreciated that when replacing a term with another term and not a placeholder, it is necessary to use a replacement term which has no meaning. Otherwise, the replacement term will itself be translated, and then, the postprocessor 160 will not find the term to be postprocessed in the metadata M(D) 180. By way of example, if the term "Provider" (240, FIG. 2) were to be replaced with the term "Potato", and not by the term "Pomalato" (540), then, when the document 200 is translated into French, each instance of "Potato" would be replaced by "pomme de terre". The postprocessor 160 would not necessarily distinguish between cases where "pomme de terre" should be replaced with the word "provider" and cases where "pomme de terre" is a translation of the word potato.

Terms such as proper names and similar matter as well as designated user-specific words which are replaced with placeholders in the document 200, and corresponding contents are placed in the metadata M(D) 180, such that after translation they may be resolved by the postprocessor 160 to the original proper names, designated user-specific words and similar matter.

In cases where a mapping is made between the source document D 110 and entries in the metadata M(D) 180, the mapping can change from document to document or even from section to section of the document. Thus, for example, in one place, New York (230, FIG. 2) may be replaced by *@321 (520), and in a second place New York (the second place is not depicted in the document 200) may be replaced by "Banana".

Reference is now additionally made to FIG. 6, which is a fourth exemplary modification of a portion of the document of FIG. 2 where the order of sentences has been permuted in the document. First document 600 displays, for the purposes of illustration, a first portion of the document 200 of FIG. 2. The individual sentences of the document 200 of FIG. 2 are identified: the first sentence is labeled sentence 620, the second sentence is labeled sentence 630, and so forth, through the fifth sentence which is labeled sentence 660. The permutation of the order of the sentences may be according to a random order.

In order to generate the second document 610, the order of the sentences is permuted, so that the locus of first sentence 620 of the first document 600 is now permuted, in the second document 610 and is now the third sentence 620. The following table shows the correspondence between the order of the sentences in the first document 600 and the second document 610.

| Sentence Number | Locus in first document 600 | Locus in the second document 610 |
| --- | --- | --- |
| 620 | First sentence | Third sentence |
| 630 | Second sentence | Second sentence |
| 640 | Third sentence | Fifth sentence |
| 650 | Fourth sentence | First sentence |
| 660 | Fifth sentence | Fourth sentence |

It should be appreciated that instead of permuting the order of sentences, as is depicted in FIG. 6, clauses may instead be permuted.

The proper order of the sentences is saved to the metadata M(D) 180, so that when the translated preprocessed document T(P(D)) 150 is received back from the online translation service 120, the sentences in the received translated preprocessed document T(P(D)) 150 can be returned to the correct order.

Reference is now additionally made to FIG. 7, which is a fifth exemplary modification of a portion of the document 710 of FIG. 2 where the sentences have been negated in the document. Using natural language processing tools comprised in the preprocessor and the postprocessor, both of which have the capability to negate a sentence from a positive to the negative and from the negative to the positive. One example of a natural language processing toolkit which may be used as described here (possibly requiring some additional programming steps within the scope of a person of skill in the art which are beyond the base library provided) is the Natural Language Toolkit provided at www.nitk.org.

By way of example, in the portion of the document 710 in FIG. 7, the word "never" 720 was added into the sentence "This is a contract entered into by Alice", etc., so that the sentence now reads: "This is a contract never entered into by Alice". Likewise, the sentence "The provider's place of business is New York", etc. has had the word "not" 730 inserted by the preprocessor 130, and is now, "The provider's place of business is not New York". The final example is the sentence "The client hereby engages the Provider", etc. The preprocessor 130 has inserted the term "does not" 740 into that sentence, yielding, "The client hereby does not engages the Provider". It should be appreciated that the addition of the term "does not" 740 produces a grammatical error, "The client hereby does not engages the Provider" (emphasis added, and noted by "engages" 750 in FIG. 7). Such modifications of a source document, such as document D 110 may sometimes result in grammatical errors, such as the one depicted here. However, it is likely following translating the document, and removal of the negating terms by the postprocessor 160, the grammatical error may be removed as well. It is also appreciated that the output of the online translation service may often be proofread and corrected by a person fluent in the target language, which will further reduce the likelihood of an occurrence of such a grammatical error. In such cases, it becomes clear that there is a tradeoff between quality of the translation and privacy received.

The identity of the negated sentences, as well as the method of negating the sentences (i.e. "never" 720; "not" 730; and "does not" 740) is noted in the metadata M(D) 180, for use by the postprocessor 160 in postprocessing the translated preprocessed document T(P(D)) 150. It is appreciated that this process may depend greatly on the nature of the natural language processing package used to perform the step of negation. It should also be appreciated that the preprocessor 130 and postprocessor 160 may comprise grammar checking modules as are known in the art to aid in preventing such situations from occurring.

As noted above, the postprocessor 160, upon receiving the translated preprocessed document T(P(D)) 150 back from the online translation service 120, is able to convert the negated sentences in the received translated preprocessed document T(P(D)) 150 back into non-negated translated sentences.

Using techniques known in the art, the preprocessor 130 can add random sentences (i.e. noise, a technique to add entropy to the source document D 110). For example, the tables found at www.trojanmice.com/randomjargongenerator.htm can be used to generate random jargon, such as the sentence "Based on the present scenario front loading delivery systems should harmonize the budgetary interface with avoiding conflicts of interest" 760. Another known website for generation of random sentences comprising an entire scientific paper is found at pdos.csail.mit.edu/scigen/. Techniques used by these websites, or other techniques known in the art may be used to add random noise to the document 710.

The metadata M(D) 180 will store the location of the random sentences, and the postprocessor 160, upon receiving the translated preprocessed document T(P(D)) 150 back from the online translation service 120, will remove the inserted random sentences.

Another technique which may be used is to buffer a plurality of different documents 200 which are meant to be sent to the online translation service 120. Sentences or clause in the different documents 200 comprising the plurality of documents can then be mixed/permuted together, in order to form a plurality of mixed up documents, which comprise related portions. The metadata M(D) 180 will store a record of which sentences and clauses come from which source document D 110, so that the postprocessor 160, upon receiving the translated preprocessed document T(P(D)) 150 back from the online translation service 120, will be able to restore the randomized/permuted sentences back to their correct source locations in the plurality of different documents 200.

Reference is now made to FIG. 8, which is a composite version of the document 800 of FIG. 2, combining the modifications depicted in FIGS. 3-7. The various modifications discussed above with reference to FIGS. 3-7 are identified in the document 800.

Reference is now made to FIG. 9 which is a French translation 900 of the document 800 of FIG. 8. The French translation 900, corresponding to translated preprocessed document T(P(D)) 150, was prepared by an online translation service 120. The various modifications discussed above with reference to FIGS. 3-7 are identified in the French translation 900 of the document 800. In a next stage, the French translation 900 of the document 800 is sent to the postprocessor 160 (FIG. 1), which utilizes the metadata M(D) 180 (FIG. 1), in order to produce a French version of the document 200 (FIG. 2), where all of the substitutions and permutations described above have been reversed.

The postprocessor and the preprocessor may be operative to apply the various documentation transformations described above in some order, which may be determined by some configuration which describes which documentation transformations to apply in which order. It may be the case that the preprocessor and the postprocessor apply the documentation transformations in reverse order from each other.

Figure 10:
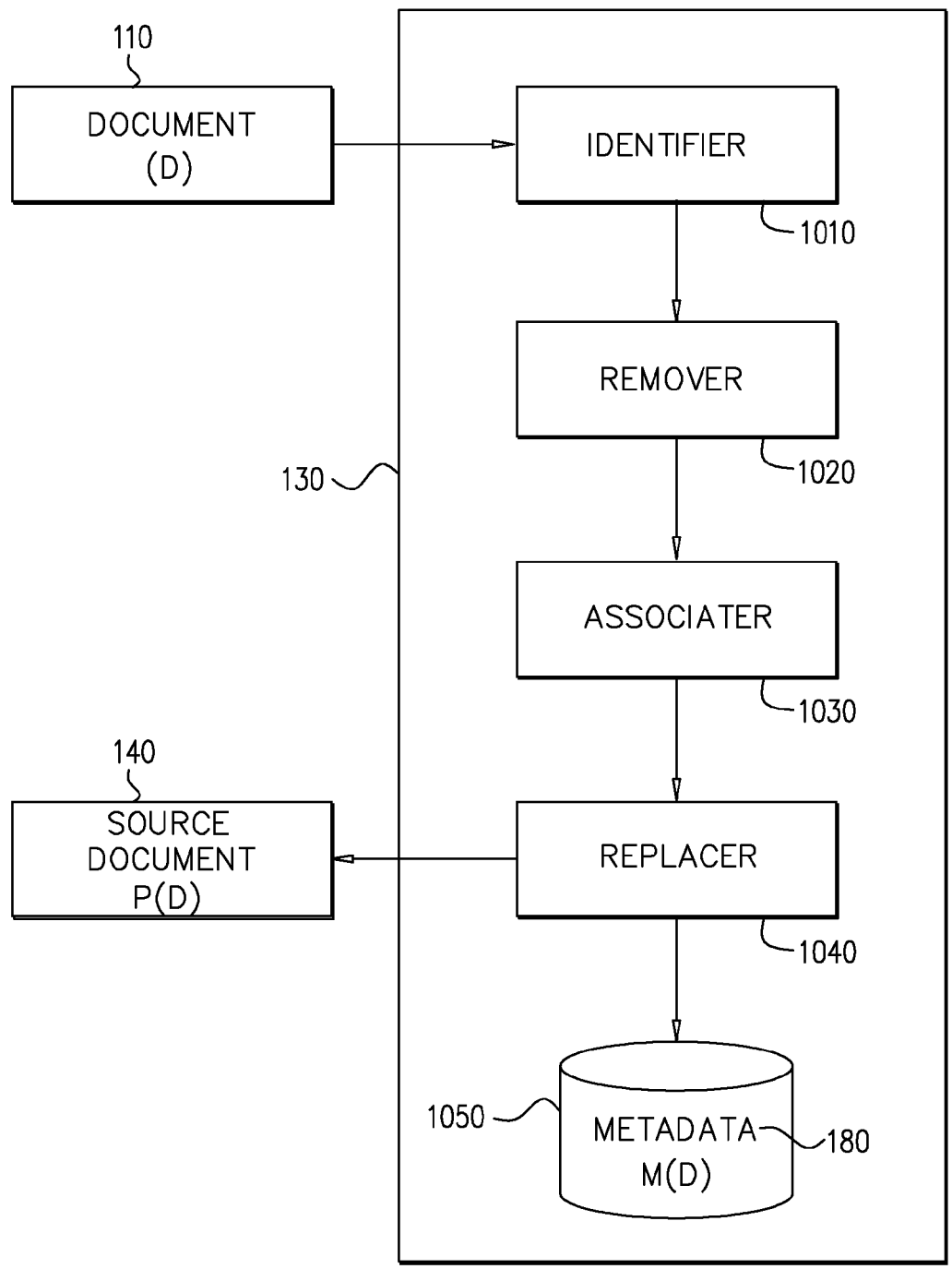
FIG. 10 is a block diagram representation of a document preprocessor for use in the system of FIG. 1.

Reference is now made to FIG. 10, which is a block diagram representation of the document preprocessor 130 for use in the system of FIG. 1. As discussed above, the preprocessor 130 receives the document (D) 110. The document (D) 110 is input into an identifier 1010 which identifies in the document information which is not to be translated. Following the identifier 1010, the document (D) 110 is then input into a remover 1020 which removes the identified not to be translated information from the document (D) 110. An associater 1030 then associates each one unit of not to be translated information with one placeholder which holds a place of the one unit of not to be translated in the document (D) 110. Following the associater 1030, a replacer 1040 then replaces the not to be translated information with placeholders in the document (D) 110. The preprocessor then stores the not to be translated information as metadata M(D) 180 in a store 1050. The source document P(D) 140 is then output by the preprocessor 130 for sending to the unsecure translation service.

Figure 11:
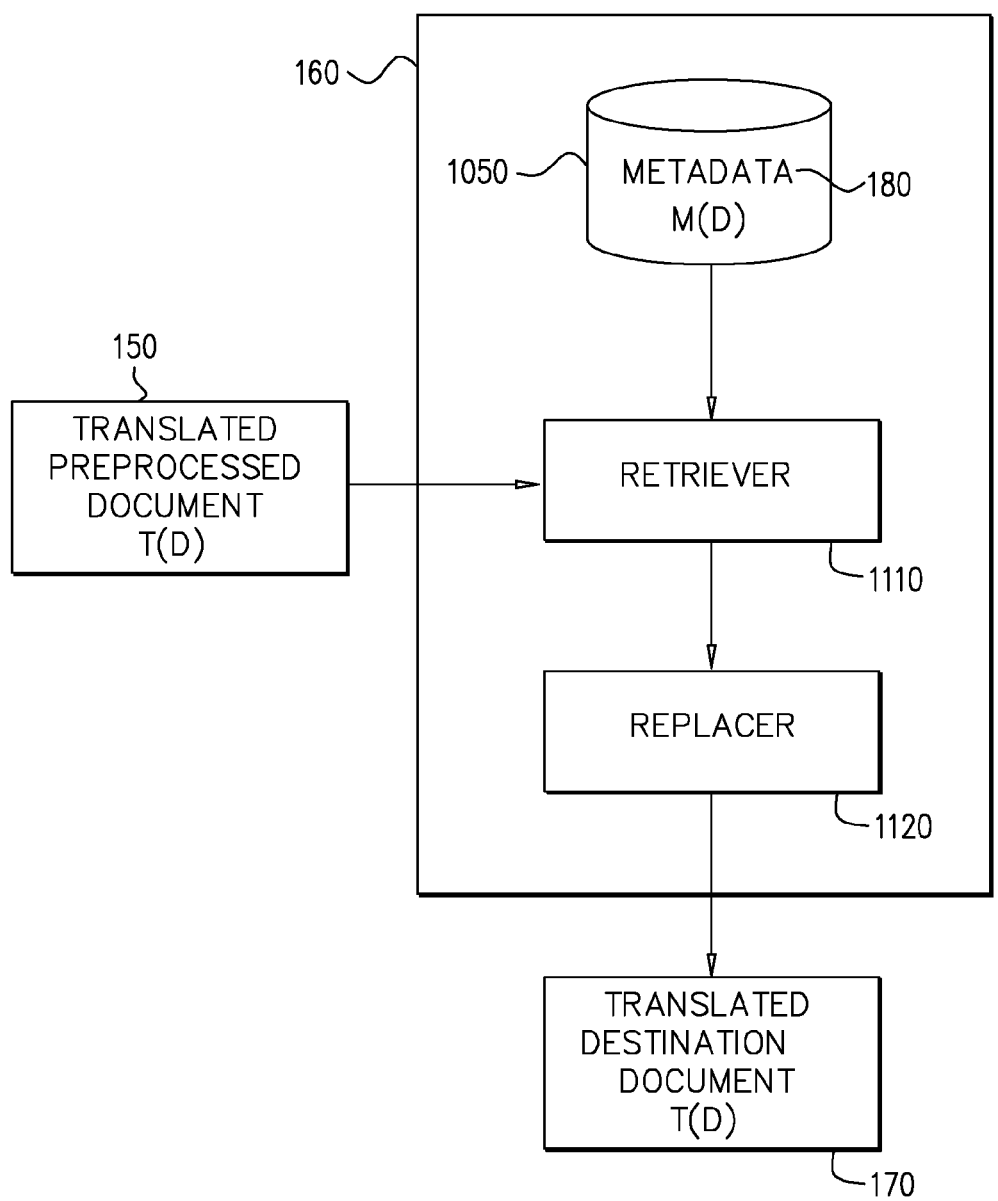
FIG. 11 is a block diagram representation of a document postprocessor for use in the system of FIG. 1.

Reference is now made to FIG. 11, which is a block diagram representation of the document postprocessor 160 for use in the system of FIG. 1. The translated preprocessed document T(P(D)) 150 is received by the postprocessor 160 and input into a retriever 1110. The retriever 1110 retrieves the stored metadata M(D) 180 from the store 1050. The translated preprocessed document T(P(D)) 150 and the retrieved stored metadata M(D) 180 are then input into a replacer 1120 which replaces each one of the placeholders in the translated preprocessed document T(P(D)) 150 with its associated one unit of not to be translated information. The postprocessor then outputs the destination document T(D) 170, i.e. the translated version of source document, D 110.

The various embodiments described above may be implemented independently or may be implemented in combination with each other. By way of non-limiting example: Each of the various modifications discussed above with reference to FIG. 3, individually, or in combination with each other, may be combined with any one or more of all of the modifications, individually, or in combination with each other, discussed above with reference to FIGS. 4-7. Similarly, each of various modifications discussed above with reference to FIGS. 4-7 may be combined any or all of the modifications discussed above with reference to one or more of all of the modifications discussed above with reference to FIGS. 3-7.

Figure 12:
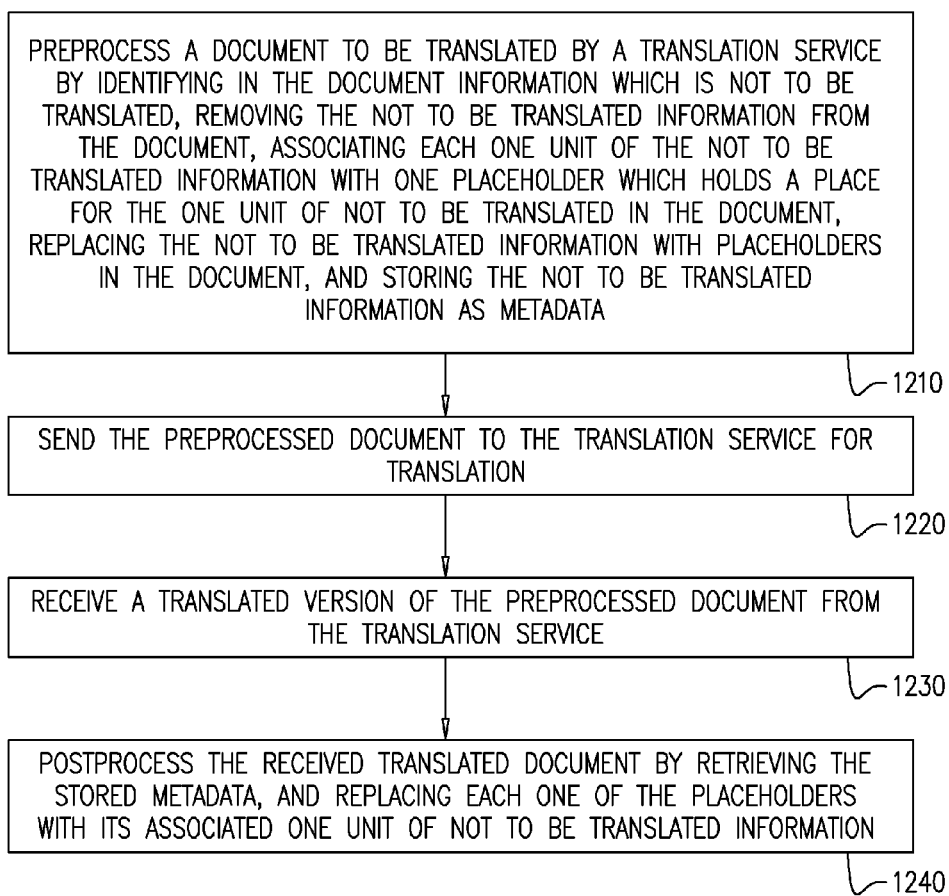
FIG. 12 is a flowchart of a method of operation of one embodiment described herein.

Reference is now made to FIG. 12, which is a simplified flow chart of one embodiment described herein. The method of FIG. 7 is believed to be self-explanatory with reference to the above discussion. In step 1210, a document to be translated by a translation service is preprocessed by identifying in the document information which is not to be translated, removing the not to be translated information from the document, associating each one unit of the not to be translated information with one placeholder which holds a place for the one unit of not to be translated in the document, replacing the not to be translated information with placeholders in the document, and storing the not to be translated information as metadata. In step 1220 the preprocessed document is sent to the translation service for translation. In step 1230 a translated version of the preprocessed document is received from the translation service. In step 1240 the received translated document is postprocessed by retrieving the stored metadata, and replacing each one of the placeholders with its associated one unit of not to be translated information.

It should be appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium, or as a web service running on an internetwork. In some cases, it may be possible to instantiate the software components as a signal interpretable by an appropriate computer, although such an instantiation may be excluded in certain embodiments of the present invention.

It should be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It should be appreciated by persons skilled in the art that the present invention is not limited by what has been particularly shown and described hereinabove. Rather the scope of the invention is defined by the appended claims and equivalents thereof:

What is claimed is:

1. A method comprising:
   preprocessing a document to be translated by a translation service by:
   identifying in the document information which is not to be translated,
   removing the not to be translated information from the document,
   associating each one unit of the not to be translated information with one placeholder which holds a place for the one unit of not to be translated in the document,
   replacing the not to be translated information with placeholders in the document, and
   storing the not to be translated information as metadata;
   sending the preprocessed document to the translation service for translation;
   receiving a translated version of the preprocessed document from the translation service; and
   postprocessing the received translated document by:
   retrieving the stored metadata, and
   replacing each one of the placeholders with its associated one unit of not to be translated information.

2. The method according to claim 1 wherein the information which is not to be translated comprises one or more of the following:
   hyperlinks;
   internal references;
   drawings;
   diagrams;
   numbers;
   equations;
   functions; and
   proper names.

3. The method according to claim 1 wherein the information which is not to be translated comprises user designated specific terms.

4. The method according to claim 1 wherein the information which is not to be translated comprises terms found in a local dictionary of terms.

5. The method according to claim 4 wherein the local dictionary of terms comprises terms for which the local dictionary holds a source term, the source term comprising a first term found in the document, and a translated term corresponding to a translation of the source term.

6. The method according to claim 5 wherein the placeholder for the source term is a second term of a same part of speech as the source term, and wherein postprocessing, based on the corresponding translated term from the local dictionary, includes replacing the translated term with the corresponding source term.

7. The method according to claim 1 and also comprising:
   applying, during preprocessing, a permutation of an order of at least some of: sentences; and clauses in the document; and
   storing a correct order of the sentences and the clauses in the document in the metadata.

8. The method according to claim 7 wherein postprocessing comprises retrieving the correct order of the sentences and the clauses in the document, and reversing the permutation in the translated document.

9. The method according to claim 1 and also comprising:
   selecting, during preprocessing, at least one sentence from the document;
   negating a meaning of the selected sentence; and
   storing an identity of the negated sentence in the metadata.

10. The method according to claim 9 wherein postprocessing comprises:
    retrieving the identity of the negated sentence from the metadata; and
    reversing a negation of the negated sentence in the translated document.

11. The method according to claim 1 and also comprising:
    adding at least one random bogus sentence or at least one random bogus clause to the document; and
    storing in the metadata an identity and a location of the at least one random bogus sentence or the at least one random bogus clause which were added to the document.

12. The method according to claim 11 wherein postprocessing comprises:
    retrieving the identity and the location of the at least one random bogus sentence or the at least one random bogus clause which were added to the document; and
    removing a translation of the at least one random bogus sentence or at the least one random bogus clause from the translated document, the removing being based on at least one of the stored location and the identity of the at least one random bogus sentence or the at least one random bogus clause.

13. The method according to claim 1 and also comprising, during preprocessing:
    buffering at least two documents to be translated and permuting a plurality of sentences and clauses from the at least two documents to form the preprocessed document to be sent for translation;
    storing a source order and an origin of the plurality of sentences and clauses from the at least two documents in the metadata; and
    sending the new document for translation.

14. The method according to claim 13 and also comprising, during postprocessing:
  retrieving the metadata; and
  restoring translated sentences and clauses from the at least two documents to their proper location in the at least two documents according to the metadata.

15. A system comprising:
  a document preprocessor which preprocesses a document to be translated by a translation service, the document preprocessor comprising:
    an identifier which identifies information in the document which is not to be translated,
    a remover which removes the identified not to be translated information from the document,
    an associater which associates each one unit of the not to be translated information with one placeholder which holds a place of the one unit of not to be translated in the document,
    a replacer that replaces the not to be translated information with placeholders in the document, and
    a store where the not to be translated information is stored as metadata;
  a sender which sends the preprocessed document to the translation service for translation;
  a receiver which receives a translated version of the preprocessed document from the translation service; and
  a document postprocessor which postprocesses the received translated document, the document postprocessor comprising:
    a retriever which retrieves the stored metadata from the store, and
    a replacer which replaces each one of the placeholders with its associated one unit of not to be translated information.

16. The system according to claim 15 wherein the information which is not to be translated comprises one or more of the following:
  hyperlinks;
  internal references;
  drawings;
  diagrams;
  numbers;
  equations;
  functions; and
  proper names.

17. The system according to claim 15 wherein the information which is not to be translated comprises user designated specific terms.

18. The system according to claim 15 wherein the information which is not to be translated comprises terms found in a local dictionary of terms.

19. The system according to claim 15 wherein the preprocessor also comprises a permuter which permutes the order of at least some of: the sentence;
  and the clauses in the document, and which stores the correct order of the sentences and the clauses in the document in the metadata in the store.

20. The system according to claim 15 wherein the preprocessor also comprises an adder which adds at least one random bogus sentence or at least one random bogus clause to the document, and which stores in the metadata an identity and a location of the at least one random bogus sentence or at least one random bogus clause which were added to the document.

* * * * *